United States Patent

Fisher et al.

[11] Patent Number: 5,951,954
[45] Date of Patent: Sep. 14, 1999

[54] METHOD FOR MANUFACTURING CLEAR BRINE FLUIDS FROM IMPURE ZINC FEEDSTOCK

[75] Inventors: Russell A. Fisher, The Woodlands, Tex.; Paul Wayland, Memphis, Tenn.; David J. Hanlon, Magnolia, Tex.

[73] Assignee: Tetra Technologies, Inc., Woodlands, Tex.

[21] Appl. No.: 08/993,914

[22] Filed: Dec. 18, 1997

[51] Int. Cl.$^6$ ............. C01G 9/00; C22B 19/00; C22B 47/00
[52] U.S. Cl. ............. 423/109; 423/50; 423/140; 423/491; 75/724; 75/725; 75/738
[58] Field of Search ............. 423/109, 50, 140, 423/491; 75/724, 725, 738

[56] References Cited

U.S. PATENT DOCUMENTS

| | | | |
|---|---|---|---|
| 682,794 | 9/1901 | Gasch | 423/109 |
| 707,434 | 8/1902 | Lones et al. | 423/101 |
| 1,137,871 | 5/1915 | Lawton | 423/491 |
| 1,261,696 | 4/1918 | Cameron et al. | 423/109 |
| 1,336,386 | 4/1920 | Sulman et al. | 75/738 |
| 1,409,727 | 3/1922 | Kardos | 423/491 |
| 1,496,004 | 6/1924 | Laist et al. | |
| 1,587,695 | 6/1925 | Campbell et al. | |
| 1,799,166 | 4/1931 | Hooey | 423/109 |
| 1,920,442 | 8/1933 | Tainton | 75/724 |
| 2,128,380 | 8/1938 | Spencer | |
| 2,772,230 | 11/1956 | Hollander et al. | 423/140 |
| 3,337,296 | 8/1967 | Hill | 423/491 |
| 3,490,867 | 1/1970 | Matsusshita et al. | 423/491 |
| 4,150,091 | 4/1979 | Peterson | 423/109 |
| 4,168,970 | 9/1979 | Ghatas | 423/101 |

FOREIGN PATENT DOCUMENTS

| | | | |
|---|---|---|---|
| 5-163020 | 6/1993 | Japan | 423/491 |

*Primary Examiner*—Steven Bos
*Attorney, Agent, or Firm*—Jo Katherine D'Ambrosio

[57] ABSTRACT

A method for utilization of zinc byproducts in the manufacture of clear brine fluids comprising the step of mixing zinc feedstock containing metal impurities with a halogenic acid to produce an impure zinc halide solution. The metal impurities are removed from the zinc halide solution in a two-stage process: the first stage comprises the steps of precipitating and filtering out manganese and iron and the second stage comprises the steps of contacting the zinc halide solution with elemental zinc to cement out the remaining metals comprising nickel, lead, cadmium, copper, mercury and cobalt. Preferably, the zinc halide solution is contacted with zinc shot in multiple passes through zinc-filled column systems. The pH is adjusted between each step, if necessary, to maintain the pH in the first stage within a range of from about 3.5 to 4.5 and the alkalinity during the second stage at less than 1.0% zinc oxide.

23 Claims, No Drawings

METHOD FOR MANUFACTURING CLEAR BRINE FLUIDS FROM IMPURE ZINC FEEDSTOCK

FIELD OF THE INVENTION

The present invention relates to a method for utilizing zinc byproducts in the manufacture of clear brine fluids. Particularly, the invention is directed to the removal of impurities from zinc halide brines produced from zinc byproducts.

BACKGROUND OF THE INVENTION

Zinc oxides are used in the manufacture of zinc halide brines. Although both premium and low grade zinc oxides can be used to produce the zinc halide brines, the low grade material can be more cost effective and environmentally beneficial because low grade zinc oxides are often recycled as byproducts from other industrial processes. These byproducts, however, may contain various impurities. The process of purifying the low grade zinc oxide is both expensive and time consuming. Using the recycled zinc oxides or zinc oxides containing impurities without the benefit of a purification process results in an end product, zinc halide for example, that has impurities.

Electrogalvanizing waste sludge, for example, has been used as a less expensive zinc source for producing zinc bromide and zinc chloride brines. The electrogalvanizing waste consists of primarily zinc hydroxide but can contain impurities such as iron, manganese, and nickel. These metal ions create problems in the final product by tinting the solution, and/or slowly precipitating. Iron and manganese can be removed from the zinc bromide and zinc chloride brines by oxidation, followed by filtration. The removal of nickel from solutions of zinc chloride is not a simple task. The general properties of nickel and zinc are similar enough that common separation methods such as pH precipitation are not usable. There is ample evidence in the mining literature that nickel can be removed by cementation onto elemental zinc dust in zinc sulfate solutions. The initial reaction favors reduction of nickel (II) to nickel, observed as the cementation of nickel onto the zinc surface. In turn the nickel metal and zinc metal can react with acidity in the solution to dissolve the metals. These reactions pose the following process considerations and production problems: excessive generation of hydrogen gas, increased zinc consumption, redissolution of nickel, and precipitation of zinc hydroxide or zinc oxide if too much acidity is consumed.

The evolution of hydrogen gas poses potential safety and engineering problems. Hydrogen is a flammable gas with a lower explosive limit of 4% and an upper explosive limit of 76.4%. This means that hydrogen, at concentrations of 4% to 76.4% in air, can ignite explosively. Also hydrogen can cause embrittlement of some metals. Therefore, lower levels of hydrogen gas generation are desired. The second process consideration is the increased consumption of zinc metal. The consumption of zinc by reaction with acid reduces the efficiency of the cementation process. Zinc consumed in this reaction results in the generation of zinc halide and hydrogen. The relative expense of consuming zinc in this reaction depends on the relative cost of the zinc oxide and the zinc metal used in the system.

The redissolution of nickel has been encountered during the batch removal of nickel from zinc chloride by zinc cementation. The nickel level in the zinc chloride is reduced through a minimum value followed by a subsequent rise in nickel concentration. This reduction of nickel concentration followed by an increase in nickel concentration has made the batch removal of nickel to a fixed concentration difficult.

A fluidized zinc bed used to remove impurities, specifically cadmium, from zinc sulfate solutions is taught in U.S. Pat. No. 3,954,452. A method of purifying zinc solutions in which zinc shot or scrap is employed to remove copper and cadmium is disclosed in U.S. Pat. No. 1,587,695. In the method of the '695 patent, zinc salt solutions containing salts of more negative metals are percolated upwardly through a compartment containing loosely packed particles of metallic zinc particles, then percolated in opposite directions through second and third compartments of greater areas, each containing metallic zinc particles.

U.S. Pat. No. 1,496,004, disclose a process for preparing pure zinc sulfate solutions in which zinc shot or balls (page 1, column 2, lines 85–86) are used to remove copper from neutral or nearly neutral solution. Arsenic, antimony and copper containing ores are leached with dilute sulfuric acid; ferric iron is precipitated from the solution; and copper is precipitated from the resulting solution by means of zinc oxide. The copper-bearing residue is further treated with sulfuric acid to dissolve the copper. The copper is precipitated out from the resulting solution.

U.S. Pat. No. 2,128,380, discloses a process for removing zinc values from concentrates. In the process, zinc dust is mixed with an acidified solution that contains zinc chloride, and the zinc dust precipitates cadmium (page 1, column 2, lines 30–49). U.S. Pat. No. 4,168,970, discloses a method for the purification of zinc sulfate solutions containing copper, cadmium and cobalt as major impurities; the method comprises the steps of 1) treating the impure zinc sulfate solution with zinc dust and an antimony and/or arsenic compound; 2) treating the partially purified solution with zinc dust and antimony and/or arsenic compound to form a cement containing essentially zinc as well as the remaining cobalt and other incidental impurities; and 3) recycling at least the major portion of the cement to be used instead of zinc dust during the first stage.

The problem of producing zinc brine from recycled zinc byproducts or zinc byproducts containing impurities has not been adequately resolved by prior teachings. It is desirable to have a method of producing zinc brine that removes nickel and other metal impurities without increased zinc consumption, redissolution of the nickel or excessive generation of hydrogen gas.

SUMMARY OF THE INVENTION

In one preferred method of this invention, the method for utilizing zinc byproducts in the manufacture of clear brine fluids comprises the steps of (a) mixing zinc feedstock comprising zinc species comprising hydroxides, oxides, carbonates or a combination thereof with halogenic acid to produce a zinc halide solution containing impurities comprising nickel, lead, cadmium, manganese, iron, copper, mercury, cobalt or a combination thereof, having a pH within a range of from 3.5 to 4.5; (b) precipitating manganese, iron or a combination thereof from the halide solution from step (a) to obtain a zinc halide solution essentially free of manganese and iron; (c) concentrating the zinc halide solution from step (b); (d) if necessary, adjusting the alkalinity of the zinc halide solution from step (c) to within a range of from about 0.2% to about 0.5% ZnO; and (e) contacting the zinc halide solution from step (d) with particulated zinc to cement nickel, lead, cadmium, copper, mercury, cobalt or a combination thereof onto a surface of the zinc to obtain a zinc halide solution essentially free of nickel, lead, cadmium, copper, mercury and cobalt.

In a preferred method, the zinc feedstock includes calcium and the zinc halide solution from step (a) includes calcium halide. In one preferred method, the zinc halide solution from step (a) comprises zinc chloride solution. Alternatively, the zinc halide solution from step (a) can comprise zinc bromide solution. In one embodiment of this invention, step (b) comprises adding an iron oxidizer to the zinc halide solution to precipitate iron. Preferably, step (b) comprises adding a manganese oxidizer to precipitate manganese. Step (b) can further comprise filtration to remove precipitates from the zinc halide solution. Preferably, the zinc halide solution of step (c) is concentrated to within a range of from about 2 to 16 molal, more preferably, about 10 to about 16 molal.

One preferred embodiment comprises the step of adjusting the alkalinity of the zinc halide solution from step (e) to within a range of from about 0.5% to about 1.0% ZnO. Preferably, the zinc halide solution temperature in the contacting step (e) is maintained between about 40° C. and about 80° C.

Step (e) preferably comprises passing the zinc halide solution through at least one zinc-containing column. In one aspect, the solution is passed through a zinc-containing column at least two times and, if necessary, the alkalinity of the solution is adjusted between column passes. Alternatively, the solution is passed through three zinc-containing columns and, if necessary, the alkalinity of the solution is adjusted between column passes. Preferably, the zinc within the column comprises elemental zinc sized greater than 1 mm. In a preferred embodiment, the alkalinity as zinc oxide in the zinc halide solution in steps (a), (b), (c), (d) and (e) is maintained at less than 1%.

In an alternative method for utilizing zinc byproducts in the manufacture of clear brine fluids the steps comprise: (a) mixing zinc feedstock comprising zinc species selected from hydroxides, oxides and carbonates with halogenic acid to produce a zinc halide solution having impurities comprising nickel, lead, cadmium, manganese, iron, copper, mercury, cobalt or a combination thereof, having a pH within a range of from 3.5 to 4.5; (b) precipitating manganese, iron or a combination thereof from the halide solution from step (a) and filtering out the resulting precipitates to obtain a zinc halide solution essentially free of manganese and iron; (c) concentrating the zinc halide solution to within a range of from about 2 to about 16 molal, more preferably, about 10 to about 16 molal; (d) if necessary, adjusting the alkalinity to within a range of from about 0.2% to about 0.5% ZnO; and (e) passing the zinc halide solution from step (d) through one or more zinc-containing columns while maintaining the alkalinity of the solution less than 1.0% ZnO, until nickel, lead, cadmium, copper, mercury, cobalt or a combination thereof are cemented onto a surface of the zinc, to obtain a zinc halide solution essentially free of nickel, lead, cadmium, copper, mercury and cobalt.

Preferably, the zinc feedstock includes calcium and the zinc halide solution from step (a) comprises calcium halide. The zinc halide solution from step (a) can comprise zinc chloride. Alternatively, the zinc halide solution from step (a) comprises zinc bromide. Step (b) comprises the steps of: (I) adding an iron oxidizer to the zinc halide solution to precipitate iron; and (ii) adding a manganese oxidizer to the zinc halide solution to precipitate manganese. In one preferred method, step (e) comprises passing the zinc halide solution through at least one zinc-containing column.

Preferably, the zinc halide solution temperature in step (e) is maintained between about 40° C. and about 80° C. A preferred embodiment of this invention includes a step of adjusting the alkalinity of the zinc halide solution resulting from step (e) to within a range of from about 0.5% to about 1.0% ZnO.

DETAILED DESCRIPTION OF THE INVENTION

In the practice of this invention, raw zinc oxides and recycled zinc byproducts from various industrial processes are used to produce clear zinc or zinc/calcium brines for reuse in drilling fluids, textile treatment, photographic emulsion, etc. In one preferred method, zinc feedstock comprising zinc oxide and/or zinc hydroxide is mixed with a halogenic acid to produce a zinc halide solution. Feedstock sources of zinc include electrogalvanizing waste sludge, from wastewater treatment sludges for example, brass mill fume, electric arc furnace dust, galvanizes, fines and ash. Although a plentiful and cheap source for zinc, these waste products tend to produce a zinc halide solution having metal impurities such as iron, manganese, nickel, lead, cadmium, copper, mercury and cobalt.

One preferred halogenic acid used for mixing with the feedstock comprises hydrogen bromide. Alternatively, hydrogen chloride can be used. A preferred zinc halide solution comprises approximately 80% zinc bromide and 20% calcium bromide. During the mixing process, the pH is adjusted to within a range of from about 3.5 to about 4.5. Caustic solutions can be added to adjust the pH if it is too low.

The zinc halide solution resulting from the mixing process is impuritied with metal impurities which can include iron, manganese, nickel, lead, cadmium, copper, mercury, cobalt and the like. A two-stage process is used to remove these impurities from the impure zinc halide solution. The first stage removes impurities that easily precipate so that they can be filtered out of the solution, such as iron and manganese for example. The second stage removes the remaining metal impurities by the process of cementation.

During the first stage, iron and manganese for example are precipitated by known methods with known oxidizing agents and then filtered out of the zinc halide solution. Preferably, oxidizing agents comprising peroxides, calcium hypochloride or sodium hypochloride are added to the zinc halide mixture to precipitate iron. The precipitated iron is removed by filtration. Manganese can be precipitated by the addition of the appropriate oxidizer to oxidize the manganese to a +4 state. Bromine is a preferred oxidizer for use with zinc bromide brines and a hypochlorite is preferred as an oxidizer for precipitating manganese in a zinc chloride brine solution. Preferably, lime or other alkalizers are used to raise the pH to within a range of from 3.5 to 4.5 to precipitate out the manganese. Filtration removes the precipitates from the zinc halide solution.

After the precipitates are filtered out, the zinc halide solution is concentrated, preferably to within a range of from about 2 to about 16 molal, more preferably about 10 to about 16 molal. Concentration of the zinc halide solution reduces the amount of hydrogen produced during the subsequent cementation process. Preferably, the solution is concentrated by evaporation. This can be accomplished in an evaporator tank with the addition of heat. Alternatively, a vacuum process can be used to concentrate the zinc halide solution. The alkalinity of the zinc halide solution is tested and, when the alkalinity is less than about 0.2% ZnO or greater than about 0.5% ZnO the alkalinity is adjusted to within a preferred range of from about 0.2 weight percent to about 0.5 weight percent zinc oxide as conventionally measured in the art by titration with a strong acid. In one preferred method, the alkalinity is about 0.4% zinc oxide. Alkalinity ranges of the zinc halide solution somewhat below 0.2% and above 0.5% can also be effective. The concentrated zinc halide solution, essentially free of iron and manganese can be used immediately, or placed into storage tanks until ready for use in a cementation process for removal of the remaining heavy metal impurities.

The second stage of purifying the zinc halide solution comprises a cementation process. One preferred cementation process comprises contacting the zinc or zinc/calcium halide solution with elemental zinc, preferably particulated zinc, zinc shot for example, to cement out nickel, lead, cadmium, copper, mercury and cobalt onto the surface of the zinc. Prior to contacting the zinc halide solution with zinc, the alkalinity of the solution is tested and maintained at less than 1% zinc oxide, preferably less than 0.8% zinc oxide. In the preferred method, the zinc halide solution is passed through one or more zinc-filled columns. Alternatively, the zinc halide solution can be passed through the same column more than once. In this alternate method, the zinc is preferably regenerated in-between passes.

The removal of nickel by zinc cementation is a surface reaction. Therefore, the surface area of the zinc is an important parameter in the effectiveness of the zinc cementation reaction. For this reason, zinc shot is the preferred elemental zinc for contacting with the zinc halide. A zinc shot column has high permeability to allow the hydrogen to easily escape and allows good flow properties within the column. Zinc scrape or zinc wire can also be used. The preferred size of the zinc is greater than one millimeter. The smaller sized zinc dust or powder is least preferred because of several reasons. The use of zinc powder or dust in the cementation process results in greater losses of zinc onto the filter cakes, thereby requiring excessive zinc to drive the process to completion. Zinc powder or dust has a further limitation of greater pressure losses as the solution passes through the column.

Preferably, the zinc halide solution is pumped through three upflow zinc-filled columns in series. The concentration of metal impurities is thereby reduced as the solution passes through each column, to obtain an effluent stream which preferably comprises less than five ppm nickel, less than one ppm lead, and less than one ppm cadmium. Between passes through the zinc-filled columns, the alkalinity of the zinc halide solution is adjusted, if necessary, to less than less than 1% zinc oxide, preferably less than 0.8% zinc oxide. Preferably, the effluent zinc halide solution has a final alkalinity adjustment to within a range of from 0.5% to 1% zinc oxide. After cementation, the zinc-nickel bed within the column can be regenerated by the selective dissolution of nickel or by sending the zinc-nickel mixture to a smelter for reprocessing.

The temperature during the preferred cementation step is maintained within a range of from about 43° C. to about 80° C., preferably 60° C.

EXAMPLES

Example 1

Zinc shot with a diameter within a range of from −5 mm to +3 mm, purchased from Fisher Scientific, was chosen for the preliminary testing for the following reasons:

1. Zinc shot is significantly cheaper than other higher surface area forms of zinc.

2. Zinc shot is a commodity form of zinc and therefore readily available.

3. A zinc shot column has a high permeability allowing hydrogen to escape relatively easily.

4. Zinc shot allows good flow properties within the column.

5. The particle size of the zinc shot prevents the carryover of zinc fines, at least initially.

The upflow zinc column used was a jacketed glass column with a one inch inside diameter, a length of 12 inches and a volume of 150 ml. A coarse glass frit in the column supported a bed of about 500 g of zinc shot with a void volume of 50% or 75 ml. The temperature of the column was regulated by pumping water at the desired temperature through the jacket. The zinc chloride feed was pumped through the column using a peristaltic pump. The analytical procedures used were:

1. Nickel: Flame AA.
2. Zinc: EDTA Titration.
3. pH: pH meter.
4. $H_2$ rate: measured by displacement of water from inverted, waterfilled graduated cylinder.
5. Alkalinity: Standard titration method expressed in terms of zinc oxide.

The initial studies were conducted with 72% zinc chloride containing 400 ppm of nickel at a pH of −0.64. The column temperature was maintained at 60° C. while flow rates of 3 ml/min and 6 ml/min resulting in residence time of 25 minutes and 12.5 minutes, respectively, were initially evaluated. Test results from the first experimental series are summarized in Table 1. The nickel level was reduced by about 90% at 3 ml/min and 85% at 6 ml/min. The cooled zinc chloride solution contained a white precipitate analyzed as zinc oxide. This was a result of the reaction between the acid in the system and the zinc shot. The molar ratio of nickel removal to hydrogen generation was about 1:5 at both flow rates. The 25 minute residence time of the liquid in the column gave the better results and additional tests were conducted at that flow rate.

The zinc shot in the column changed colors and appearance after being exposed to the zinc chloride solution containing nickel. The surface of the zinc became rougher and acquired a darker color after exposure to the zinc chloride. This pitting of the zinc shot may partially explain the better than expected efficiency of the zinc shot in removing nickel from the zinc chloride solution.

TABLE 1

One Column Nickel/Zinc Cementation

| Sample ID | Flow Rate (ml/min) | Temp (° C.) | Operat. Time (min.) | Alkalinity (%) | Effluent Nickel (ppm) | % Ni Removed | H Rate (ml/min) |
|---|---|---|---|---|---|---|---|
| AB10048A | 3 | 59 | 25 | NA | 34 | 91.5 | NA |
| AB10048B | 3 | 59 | 35 | 0.36 | 73 | 81.75 | NA |
| AB10048C | 3 | 59 | 95 | NA | 62 | 84.5 | NA |
| AB10048D | 3 | 59 | 105 | 0.42 | 52 | 87 | 2.0 |
| AB10048E | 3 | 59 | 165 | NA | 30 | 92.5 | NA |
| AB10048F | 3 | 59 | 175 | 0.5 | 34 | 91.5 | NA |
| AB10049A | 6 | 59 | 13 | NA | 46 | 88.5 | NA |
| AB10049B | 6 | 59 | 20 | 0.46 | 76 | 81 | NA |
| AB10049C | 6 | 59 | 80 | NA | 72 | 82 | NA |

TABLE 1-continued

One Column Nickel/Zinc Cementation

| Sample ID | Flow Rate (ml/min) | Temp (° C.) | Operat. Time (min.) | Alkal- inity (%) | Effluent Nickel (ppm) | % Ni Re- moved | H Rate (ml/ min) |
|---|---|---|---|---|---|---|---|
| AB10049D | 6 | 59 | 85 | 0.50 | 58 | 85.5 | 4.9 |
| AB10049E | 6 | 59 | 145 | NA | 73 | 81.75 | NA |
| AB10049F | 6 | 59 | 150 | 0.54 | 59 | 85.25 | NA |

Feed solution: 72% $ZnCl_2$, 400 ppm NI,, pH −0.64, alkalinity 0.31% as ZnO; NA = Not analyzed.

Example 2

An upflow zinc column system was investigated using two zinc shot columns arranged in series. An acidizing reactor adjusted the pH of the first column effluent to prevent the precipitation of zinc oxide and maintain the brine at the desired pH for the second column. The feed solution was 62% zinc chloride containing 1000 ppm nickel(II) at a pH of −0.05. Column temperatures were regulated at 60° C. and the feed rate was 1.2 mL/min resulting in a residence time of 60 minutes. The columns used were about 1 inch in diameter and 12 inches long containing about 500 g zinc shot with a void volume of about 50%. Acid additions were based on a volume to volume ratio. The results of this study are summarized in Table 2. These results illustrate the continuing reduction in nickel concentration through two zinc shot columns. The goal of 10 ppm nickel was achieved in one of the four days of the test.

There were several observations made during the operation of the upflow columns. These observations included:
1. Change in zinc shot color with continued exposure to feed solution.
2. The column effectiveness increased with longer operating time after a overnight shut down.
3. Precipitation of ZnO in the effluent zinc chloride.
4. Pitting of zinc shot upon exposure to feed solution.
5. Zinc shot becomes soft and spongy after continued exposure to acidic feed solution.

Nickel concentration in the effluent was reduced by 99% (from 1000 ppm to about 10 ppm) in 62% zinc chloride with a residence time in each column of about 25 minutes.

Example 3

This experiment tested the ability of a process based on upflow zinc cementation to reduce the nickel concentration of a zinc chloride brine containing 1000 ppm nickel to 10 ppm or less by using a three-stage upflow column process. Test conditions were selected to maximize the probability of the process producing effluent with less than 10 ppm nickel. The process conditions were: 70% zinc chloride; 1000 ppm nickel; alkalinity 0.3% as ZnO; 75° C. temperature; 3 ml/min flowrate; 25 minute residence time per stage.

Three jacketed columns about 1 inch in diameter and 12 inches long were used. About 500 g of zinc shot (2–14 mm) with a void volume of 50% was placed in each column. The acid used for adjusting the pH between stages was a 1:1 vol/vol 70% $ZnCl_2$/38% HCl solution. The chemical analyses used are the same as in Example 1. The nickel removal results are summarized in Table 3. The first column one effluent had 76–97% nickel removal (effluent nickel concentration of 243–32 ppm), the second column effluent had 84–97% nickel removal (effluent nickel concentration of 22–3 ppm) and the third column effluent had 58–88% nickel removal (effluent nickel concentration of 17–1 ppm).

An anomalous value was observed for sample AS10286D where the second column effluent nickel concentration was 3 ppm and the third column effluent nickel concentration was 6 ppm. Upsets occurred primarily due to the plugging of the glass frit in the column and precipitation of ZnO in the effluent lines. These problems were treated by injecting small stages of 1:1 acid and dissolving the plugging material. The process appeared to consistently meet the desired

TABLE TWO

Two-Column Nickel/Zinc Cementation Results

| Sample ID | Temp. (° C.) | Time (min.) | Col 1 Ni (ppm) | Col 2 Ni (ppm) | Col 1 H mL/min. | Col 2 H mL/min. | Mol. Ratio Col 1 H:Ni** | Mol. Ratio Col 2 H:Ni** |
|---|---|---|---|---|---|---|---|---|
| AB10077B/C | 59 | 70 | 246 | 26 | 12 | 4.8 | 15.2 | 20.9 |
| AB10077E/F | 59 | 150 | 283 | 40 | 11.6 | 2.8 | 15.5 | 11.0 |
| AB10077H/I | 60 | 230 | 260 | 60 | 12.2 | 5.6 | 15.8 | 26.8 |
| AB10077K/L | 60 | 310 | 267 | 48 | 15.7 | 4.4 | 20.5 | 19.2 |
| AB10077N/O | 60 | 390 | 260 | 40 | 16 | 4.4 | 20.7 | 19.1 |
| AB10078B/C | 61 | 80 | 392 | 42 | 13 | 7.2 | 20.5 | 19.7 |
| AB10078E/F | 61 | 160 | 248 | 30 | NA | NA | NA | NA |
| AB10078H/I | 60 | 240 | 203 | 18 | 13 | 8.2 | 15.6 | 42.4 |
| AB10078K/L | 60 | 320 | 209 | 15 | 13.8 | 8 | 16.7 | 39.5 |
| AB10079B/C | 60 | 400 | 204 | 15 | 12 | 9.7 | 14.4 | 49.1 |
| AB10080B/C | 60 | 80 | 594 | 30 | 14.5 | 10.8 | 34.2 | 18.3 |
| AB10080E/F | 60 | 160 | 375 | 31 | 15.2 | 10.5 | 23.3 | 29.2 |
| AB10080H/I | 60 | 240 | 225 | NA | 17.5 | 13.3 | 21.6 | 56.6 |
| AB10080K/L | 60 | 320 | 196 | 14 | 15.7 | 12.8 | 18.7 | 67.3 |
| *AB10081B/C | 60 | 140 | 189 | 10 | 20.7 | 16 | 24.4 | 85.5 |
| AB10081E/F | 60 | 220 | 203 | 12 | 21 | 15.7 | 25.2 | 78.6 |
| AB10081H/I | 60 | 300 | 179 | 25 | 21 | 14 | 24.5 | 87.0 |
| AB10081K/L | 60 | 380 | 175 | 28 | 19 | 17.9 | 22.0 | 116.5 |

Feed solution: 62% $ZnCl_2$, 1000 ppm Ni, pH −0.05, Flow Rate 1.2 mL/min.
*Column was flushed one hour with feed rate 6 mL/min.
**Molar ratio of evolved hydrogen to nickel removed.
NA: Not analyzed.

effluent nickel concentration of less than 10 ppm for 11 out of 12 days of testing.

but, the amount of nickel removed decreased dramatically for the second and third columns. This reduction in nickel

TABLE 3

Nickel Removal.

| Sample ID | Op. Time (min.) | C1 Ni (ppm) | C2 Ni (ppm) | C3 Ni (ppm) | C1 Ni Rem (%) | C2 Ni Rem (%) | C3 Ni Rem (%) | C2 pH | C3 pH |
|---|---|---|---|---|---|---|---|---|---|
| AB10524B | 125 | 69 | 11.3 | 4.7 | 93 | 84 | 58 | 0.4 | −1.2 |
| AB10524D | 250 | 83 | 10.5 | 2 | 92 | 87 | 81 | −0.8 | −1.2 |
| AB10524F | 125 | 113 | 11.6 | 2.1 | 89 | 90 | 82 | −2.3 | −1.3 |
| AB10524H | 250 | 96 | 9.1 | 2.2 | 90 | 91 | 76 | −0.4 | −1.0 |
| AB10524G | 375 | 121 | 9.7 | 1.6 | 88 | 92 | 84 | −0.4 | −0.2 |
| AB10526B | 125 | 176 | 11.3 | 2.7 | 82 | 94 | 76 | −2.0 | −0.1 |
| AB10526D | 250 | 225 | 9.1 | 2 | 78 | 96 | 78 | −0.2 | 0.1 |
| AB10526F | 375 | 228 | 8.9 | 1.6 | 77 | 96 | 82 | −0.2 | 0.2 |
| AB10526G | 125 | 242 | 21 | 4.5 | 76 | 91 | 79 | −0.4 | 0.1 |
| AB10526H | 250 | 220 | 11 | 1.2 | 78 | 95 | 89 | −0.4 | 0.1 |
| AB10526L | 325 | 232 | 13.8 | 2.1 | 77 | 94 | 85 | NA | NA |
| AS10284B | 290 | 170 | 19.5 | 2.3 | 83 | 89 | 88 | −0.2 | −0.1 |
| AS10286B | 290 | 100 | 3.2 | 6.3 | 90 | 97 | −97 | −0.5 | 0.2 |
| AS10286D | 180 | 32 | 3.7 | 1.9 | 97 | 88 | 49 | −1.4 | 0.0 |
| AB10527B | 185 | 141 | 21.6 | 16.5 | 86 | 85 | 24 | −1.0 | 0.8 |
| AB10527F | 185 | 206 | 13 | 3.5 | 79 | 94 | 73 | −0.6 | 0.3 |
| AB10527H | 310 | 216 | 12.6 | 3.3 | 78 | 94 | 74 | −0.6 | 0.3 |
| AB10527G | 124 | 242 | 18.4 | 3.8 | 76 | 92 | 79 | −1.3 | 0.3 |
| AB10527L | 310 | 224 | 16.1 | 4.4 | 78 | 93 | 73 | −0.7 | 0.1 |
| AB10532B | 305 | 243 | 22.5 | 6.3 | 76 | 91 | 72 | −0.5 | 0.1 |

Feed solution: 70% $ZnCl_2$, 1000 ppm Ni, pH 0.0, and alkalinity 0.3% as ZnO
Feed rate: About 3 ml/min
Temperature: 75° C.

Generation of hydrogen is a side reaction that occurs during zinc cementation. Hydrogen evolution consumes elemental zinc, reducing the capacity of a zinc column for nickel removal. The larger the ratio, the lower the efficiency. Table 4 is a summary of this data. The rate of hydrogen evolution was about the same for all three columns initially but, the amount of nickel removed decreased dramatically for the second and third columns. This reduction in nickel removal resulted in a much higher $H_2$:Ni ratio. Effectively, the column efficiency decreased at low nickel concentrations. Also noted was the reduction in the hydrogen evolution rate in the first column as a function of the amount of brine passed through the column.

TABLE 4

Nickel Removal versus Hydrogen Evolution

| Sample ID | Op. Time (min) | C1 Ni Rem (ppm) | C2 Ni Rem (ppm) | C3 Ni Rem (ppm) | C1 $H_2$ (ml/min) | C2 $H_2$ (ml/min) | C3 $H_2$ (ml/min) | C1 H:Ni | C2 H:Ni | C3 H:Ni |
|---|---|---|---|---|---|---|---|---|---|---|
| AB10524B | 125 | 931 | 58 | 7 | 15.3 | 11.7 | 11.0 | 5.3 | 65.4 | 509.8 |
| AB10524D | 250 | 917 | 73 | 9 | 12.0 | 14.0 | 11.0 | 4.2 | 62.2 | 396.5 |
| AB10524F | 125 | 887 | 101 | 10 | 9.3 | 12.5 | 11.0 | 3.4 | 40.2 | 356.9 |
| AB10524H | 250 | 904 | 87 | 7 | 9.5 | 15.0 | 13.0 | 3.4 | 55.9 | 602.5 |
| AB10524G | 375 | 879 | 111 | 8 | 8.5 | 17.0 | 13.5 | 3.1 | 49.7 | 547.5 |
| AB10526B | 125 | 824 | 165 | 9 | 7.0 | 19.5 | 13.5 | 2.8 | 38.3 | 486.6 |
| AB10526D | 250 | 775 | 216 | 7 | 6.5 | 16.0 | 14.0 | 2.7 | 24.0 | 648.8 |
| AB10526F | 375 | 772 | 219 | 7 | 6.0 | 20.5 | 16.5 | 2.5 | 30.4 | 746.7 |
| AB10526G | 125 | 758 | 221 | 17 | 3.5 | 17.5 | 15.0 | 1.5 | 25.7 | 286.3 |
| AB10526H | 250 | 780 | 209 | 10 | 4.5 | 16.5 | 11.5 | 1.9 | 2.6 | 373.1 |
| AB10526L | 325 | 768 | 218 | 12 | 3.5 | 17.5 | 16.0 | 1.5 | 26.0 | 432.6 |
| AS10284B | 290 | 830 | 151 | 17 | 7.5 | 21.5 | 12.0 | 2.9 | 46.2 | 229.0 |
| AS10286B | 290 | 900 | 97 | −3 | 6.5 | 17.5 | 12.0 | 2.3 | 58.5 | |
| AS10286D | 180 | 968 | 28 | 2 | 7.5 | 19.0 | 10.7 | 2.5 | 220.1 | 1735.6 |
| AB10527B | 185 | 859 | 119 | 5 | 3.3 | 16.0 | 10.0 | 1.2 | 23.6 | 648.8 |
| AB10527F | 185 | 794 | 193 | 10 | 3.0 | 16.0 | 10.0 | 1.2 | 26.9 | 324.4 |
| AB10527H | 310 | 784 | 203 | 9 | 3.0 | 13.0 | 10.0 | 1.2 | 20.8 | 360.5 |
| AB10527G | 125 | 758 | 224 | 15 | 2.7 | 10.0 | 6.0 | 1.2 | 14.5 | 129.8 |
| AB10527L | 310 | 776 | 208 | 12 | 5.0 | 12.0 | 12.5 | 3.1 | 18.7 | 337.9 |
| AB10532B | 305 | 757 | 221 | 16 | 3.5 | 10.0 | 14.5 | 1.5 | 14.7 | 294.0 |

*Feed solution: 70% $ZnCl_2$, 1000 ppm Ni, pH 0.0, and alkalinity 0.3% as ZnO
Feed rate: About 3 ml/min
Temperature: 75° C.

The three stage system consisted of three upflow zinc columns in series at 75° C. with a pH adjustment between stages. Concentration of nickel in the effluent was reduced by 99% (from 1000 ppm to about 10 ppm) in 70% zinc chloride with a residence time in each column of about 25 minutes. This performance was maintained for 11 out of 12 days of operation. The capability of the process to reduce effluent nickel levels to less than 10 ppm is clearly illustrated. Hydrogen evolution appears to be independent of the nickel removal. Column efficiency is related to the amount of nickel in the feed and the rate of hydrogen evolution. The rate of hydrogen evolution decreases in column 1 as the amount of brine passed through the column increases.

The foregoing description is illustrative and explanatory of preferred embodiments of the invention, and variations in the size, shape, materials and other details will become apparent to those skilled in the art. It is intended that all such variations and modifications which fall within the scope or spirit of the appended claims be embraced thereby.

We claim:

1. A method for utilizing zinc byproducts in the manufacture of clear brine fluids comprising the steps of:
   (a) mixing zinc feedstock comprising zinc species comprising hydroxides, oxides, carbonates or a combination thereof with halogenic acid to produce a zinc halide solution containing impurities comprising nickel, lead, cadmium, manganese, iron, copper, mercury, cobalt or a combination thereof, having a pH within a range of from 3.5 to 4.5;
   (b) precipitating manganese, iron or a combination thereof from the halide solution from step (a) to obtain a zinc halide solution essentially free of manganese and iron;
   (c) concentrating the zinc halide solution from step (b);
   (d) when the alkalinity is less than about 0.2% ZnO or greater than about 0.5% ZnO, adjusting the alkalinity of the zinc halide solution from step (c) to within a range of from about 0.2% to about 0.5% ZnO; and
   (e) contacting the zinc halide solution from step (d) with particulated zinc to cement nickel, lead, cadmium, copper, mercury, cobalt or a combination thereof onto a surface of the zinc to obtain a zinc halide solution essentially free of nickel, lead, cadmium, copper, mercury and cobalt.

2. The method of claim 1 wherein the zinc feedstock includes calcium and the zinc halide solution from step (a) includes calcium halide.

3. The method of claim 1 wherein the zinc halide solution from step (a) comprises zinc chloride solution.

4. The method of claim 1 wherein the zinc halide solution from step (a) comprises zinc bromide solution.

5. The method of claim 1 wherein step (b) comprises adding an iron oxidizer to the zinc halide solution to precipitate iron.

6. The method of claim 1 wherein step (b) comprises adding a manganese oxidizer to precipitate manganese.

7. The method of claim 1 wherein step (b) further comprises filtration to remove precipitates from the zinc halide solution.

8. The method of claim 1 wherein the zinc halide solution of step (c) is concentrated to within a range of from about 2 to about 16 molal.

9. The method of claim 1 further comprising the step of adjusting the alkalinity of the zinc halide solution from step (e) to within a range of from about 0.5% to about 1.0% ZnO.

10. The method of claim 1 wherein the zinc halide solution temperature in the contacting step (e) is maintained between about 40° C. and about 80° C.

11. The method of claim 1 wherein step (e) comprises passing the zinc halide solution through at least one zinc-containing column.

12. The method of claim 11 wherein the solution is passed through a zinc-containing column at least two times and, if necessary, adjusting the alkalinity of the solution between column passes.

13. The method of claim 11 wherein the solution is passed through three zinc-containing columns and, if necessary, adjusting the alkalinity of the solution between column passes.

14. The method of claim 11 wherein the zinc within the column comprises elemental zinc sized greater than 1 mm.

15. The method of claim 1 wherein alkalinity as zinc oxide in the zinc halide solution in steps (a), (b), (c) and (e) is maintained at less than 1%.

16. A method for utilizing zinc byproducts in the manufacture of clear brine fluids comprising the steps of:
   (a) mixing zinc feedstock comprising zinc species selected from hydroxides, oxides and carbonates with halogenic acid to produce a zinc halide solution containing impurities comprising nickel, lead, cadmium, manganese, iron, copper, mercury, cobalt or a combination thereof, having a pH within a range of from 3.5 to 4.5;
   (b) precipitating manganese, iron or a combination thereof from the halide solution from step (a) and filtering out the resulting precipitates to obtain a zinc halide solution essentially free of manganese and iron;
   (c) concentrating the zinc halide solution to within a range of from about 2 to about 16 molal;
   (d) when the alkalinity is less than about 0.2% ZnO or greater than about 0.5% ZnO, adjusting the alkalinity to within a range of from about 0.2% to about 0.5% ZnO; and
   (e) passing the zinc halide solution from step (d) through one or more zinc-containing columns while maintaining the alkalinity of the solution less than 1.0% ZnO, until nickel, lead, cadmium, copper, mercury, cobalt or a combination thereof are cemented onto a surface of the zinc, to obtain a zinc halide solution essentially free of nickel, lead, cadmium, copper, mercury and cobalt.

17. The method of claim 16 wherein the zinc feedstock includes calcium and the zinc halide solution from step (a) comprises calcium halide.

18. The method of claim 16 wherein the zinc halide solution from step (a) comprises zinc chloride.

19. The method of claim 16 wherein the zinc halide solution from step (a) comprises zinc bromide.

20. The method of claim 16 wherein step (b) comprises the steps of:
   (i) adding an iron oxidizer to the zinc halide solution to precipitate iron; and
   (ii) adding a manganese oxidizer to the zinc halide solution to precipitate manganese.

21. The method of claim 16 wherein step (e) comprises passing the zinc halide solution through at least one zinc-containing column.

22. The method of claim 16 wherein the zinc halide solution temperature in step (e) is maintained between about 40° C. and about 80° C.

23. The method of claim 16 further comprising the step of adjusting the alkalinity of the zinc halide solution resulting from step (e) to within a range of from about 0.5% to about 1.0% ZnO.

* * * * *